United States Patent [19]
Johnson

[11] Patent Number: 4,558,926
[45] Date of Patent: Dec. 17, 1985

[54] ACOUSTO-OPTIC BEAM DEFLECTOR

[75] Inventor: Joel C. Johnson, Lake Oswego, Oreg.

[73] Assignee: Electro Scientific Industries, Inc., Portland, Oreg.

[21] Appl. No.: 459,303

[22] Filed: Jan. 20, 1983

[51] Int. Cl.$^4$ ............................................. G02F 1/11
[52] U.S. Cl. ................................................. 350/373
[58] Field of Search .................. 350/358, 372-373, 350/371

[56] References Cited

U.S. PATENT DOCUMENTS

| | | | |
|---|---|---|---|
| 3,679,288 | 7/1972 | Harris | 350/371 |
| 3,756,689 | 9/1973 | Hammond et al. | 350/372 |
| 4,052,121 | 10/1977 | Chang | 350/372 |

FOREIGN PATENT DOCUMENTS 495850  9/1953  Canada .................................. 350/371

OTHER PUBLICATIONS

Yariv, A., "Introduction to Optical Electronics", Holt Rinehart & Winston, 1976, pp. 337-353.
Uchida et al., "Elastic & Photoelastic Properties of Te or Single Crystal", Jr. of App. Physics, 11-1969, pp. 4692-4695.
Eklund et al., "Rotation of Laser Beam Polarization in Acoustic-Optic Devices", Optical & Quantum Electronics, 3-1975, pp. 73-79.
Schmidt-Tiedemann, K. J., "Stress Optical Constants of Germanium", Jr. of App. Physics, 10-1961, pp. 2058-2059.
Scudieri et al., "Opto-Acoustic Modulator with a Nematic Liquid Crystal", Optics Communications", 9-1975, pp. 57-59.
Mandel et al., "Production of a Phase Grating in an Acoustooptic Interaction in Lithium Niobate", Sov. Tech. Phys. Lett., 6-1978, pp. 297-298.

*Primary Examiner*—William H. Punter
*Attorney, Agent, or Firm*—Stoel, Rives, Boley, Fraser & Wyse

[57] ABSTRACT

An acousto-optic beam deflector comprises an optically active stress optic medium, such as crystalline quartz, driven by a longitudinal acoustic wave transducer. The deflector is independent of optical polarization, and therefore both polarization components of an input optical beam, such as a laser beam, are scattered with equal efficiencies.

10 Claims, 1 Drawing Figure

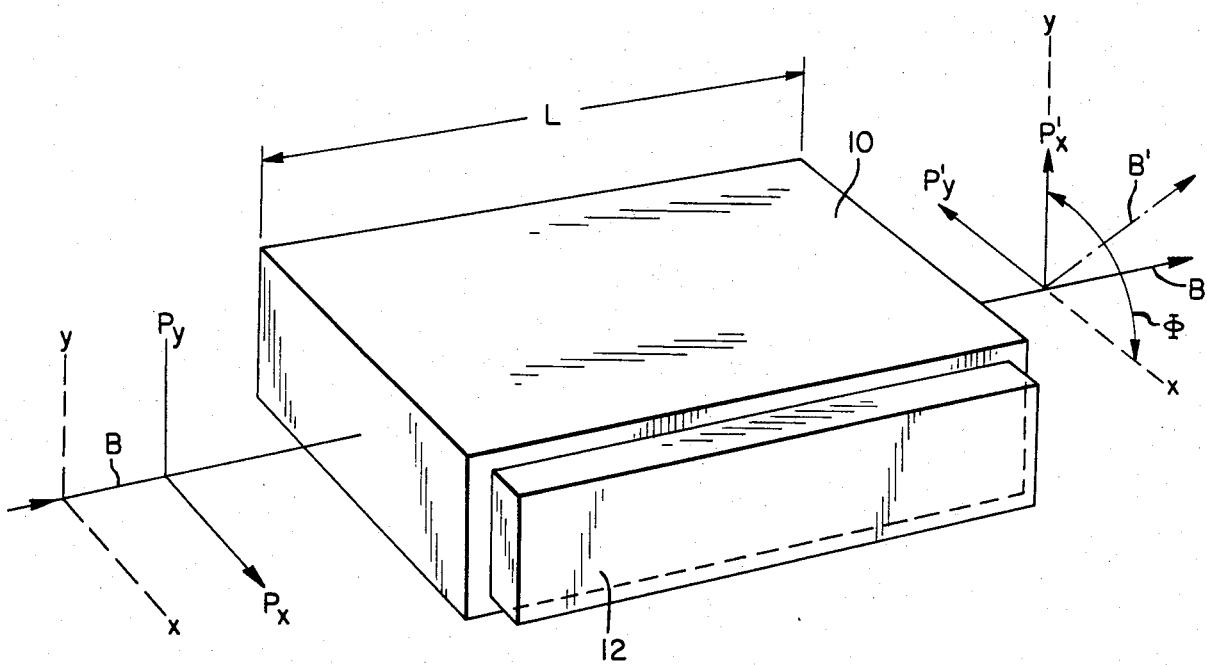

ACOUSTO-OPTIC BEAM DEFLECTOR

BACKGROUND OF THE INVENTION

The invention relates to acousto-optic beam deflectors, and more particularly to an acousto-optic beam deflector characterized by deflecting both polarization components of an optical beam with equal efficiency.

Conventional acousto-optic beam deflectors utilize a longitudinal acoustic wave transducer to produce a traveling longitudinal acoustic wave in a piece of isotropic stress optic material, such as glass. The traveling acoustic wave modulates the index of refraction of the glass through the stress optic effect. The incident light beam is then diffracted by the traveling phase grating produced by the traveling acoustic wave. For sound propagating parallel to the x axis, light which is propagating parallel to the z axis and is polarized parallel to the y axis will be more strongly diffracted than light polarized parallel to the x axis.

It is possible to produce an acousto-optic beam deflector which affects both polarizations equally, by inducing an acoustic shear wave into the stress optic medium instead of a longitudinal acoustic wave. However, acoustic shear waves are less efficiently produced and suffer greater attenuation then longitudinal acoustic waves once in the stress optic medium.

The foregoing and related prior art are discussed in detail in Chapter 12 of Introduction to Optical Electronics, by Amnon Yariv, 1976, published by Holt, Reinhard & Winston.

SUMMARY OF THE INVENTION

It is basic concept, the acousto-optic beam deflector of this invention utilizes an optically active stress optic medium driven by a longitudinal acoustic wave transducer, to effect deflection of both polarization components of an input optical beam with equal efficiency.

The principle objective of this invention is to provide an acousto-optic beam deflector which is independent of optical polarization.

Another objective of this invention is to provide an acousto-optic beam deflector which utilizes a conventional longitudinal acoustic wave transducer.

Still another objective of this invention is the provision of an acousto-optic beam deflector which utilizes an optically active stress optic medium instead of an isotropic stress optic medium.

The foregoing and other objects and advantages of this invention will appear from the following detailed description taken in connection with the accompanying drawing of a preferred embodiment.

BRIEF DESCRIPTION OF THE DRAWING

The single FIGURE is an isometric view of an acousto-optic beam deflector embodying the features of this invention, the same being shown in schematic form together with a graphic representation of the resulting deflection of the polarization components of an optical beam.

DESCRIPTION OF THE PREFERRED EMBODIMENT

As mentioned above, this invention provides an acousto-optic beam deflector which utilizes an optically active stress optic medium. By definition, an optically active material is a material for which the velocities of right and left circularly polarized light are different. A linearly polarized beam passing through an optically active medium remains linearly polarized even though the plane of polarization rotates. A stress optic medium is an optically transparent medium whose index of refraction can be modulated by stressing the medium. Accordingly, an optically active stress optic medium is a substance possessing both of the foregoing properties.

In the drawing there is illustrated an optically active stress optic medium in the form of a block 10 of optically active stress optic material. This material is preferably crystalline quartz. However, the medium may be provided by any other suitable solid substance, or by a suitable optically active liquid substance or an aqueous or other solution of sucrose, glucose, or other optically active substance, confined in a suitable transparent container.

Bonded or otherwise coupled to the block 10 is a conventional longitudinal acoustic wave transducer 12. Many types of such transducers are available commercially, such as those produced by Crystal Technology, Inc. of Palo Alto, Calif. Typical of such transducers is the 36° Y cut lithium niobate block operated at a resonant frequency of 40.68 mHz. This specific transducer has been found suitable for use in deflecting a desired portion of the output beam of a Q-switched laser for use in trimming electrical resistors and capacitors.

Accordingly, as an example of a typical deflector embodying the features of this invention, the optically active stress optic medium may be a block 10 of crystalline quartz and the transducer 12 may be the above exemplified lithium niobate block bonded to the block 10 by an epoxy adhesive.

In the drawing, the input optical beam B is exemplified as having polarization components $P_x$ and $P_y$ disposed parallel to the x and y coordinates. At the input to the medium 10 the y polarization will be scattered by the longitudinal acoustic wave produced by the transducer 12 to a greater extent than the x polarization. However, as the optical beam travels through the medium the input y polarization component is rotated into the x direction and the input x polarization component is rotated into the more strongly interacted y direction.

In an optically active medium of length L having a specific rotation of $\phi$ radians per millimeter for solids and radians per decimeter for liquids and solutions, light having traveled through the length L of the medium will have its polarizations rotated by an amount $\Phi = \phi L$. Accordingly, by making the length L of the optically active medium 10 equal to or an integral multiple of the length $L = \pi/2\phi$, any input polarization, including random polarizations, will be scattered with the same efficiency. This is illustrated in the drawing by the equal output polarization components $P_x'$ and $P_y'$, rotated by an integer multiple of 90°.

It is to be noted that if the length L involves a substantial multiple of $\pi/2\phi$, any additional fraction of $\pi/2\phi$ which might be included in the total length L will have insignificant adverse effect on the scattering efficiency.

The drawing also illustrates the diffracted output portion B' of the input beam B. As is well known, the angle of diffraction is the ratio of the wavelength of the light to the wavelength of the sound. These wavelengths may be chosen to provide any desired angle of diffraction. Either of these output portions B or B'0 may be utilized, as desired.

The deflector of this invention has a variety of uses. For example, in addition to use as a beam deflector, or Bragg cell, it may be used as a modulator, attenuator, and other purposes.

It will be apparent to those skilled in the art that various changes may be made in the size, shape, type, and arrangement of parts described hereinbefore without departing from the spirit of this invention and the scope of the appended claims.

Having now described my invention and the manner in which it may be used, I claim:

1. An acousto-optic beam deflector, comprising:
   an optically active stress optic medium that receives an optical beam having first and second polarization components, the medium being positioned so that the polarization components of the beam rotated as it travels through the medium; and
   a longitudinal acoustic wave transducer which is coupled to the medium to produce a longitudinal acoustic wave that interacts with the polarization components to diffract each one of them by a different amount,
   the medium being of a predetermined length so that each one of the polarization components rotates by an amount that substantially compensates for the difference in the amounts of diffraction, thereby to develop an optical beam whose polarization components are deflected with equal efficiencies.

2. The acousto-optic beam deflector of claim 1 wherein the optically active stress optic medium comprises crystalline quartz.

3. The acousto-optic beam deflector of claim 1 wherein the optically active stress optic medium comprises an optically active stress optic liquid substance.

4. The acousto-optic beam deflector of claim 1 wherein the predetermined length of the optically active stress optic medium through which the optical beam travels is equal to or an integral multiple of $\pi/2\phi$ wherein $\phi$ is the specific rotation of the medium.

5. The acousto-optic beam deflector of claim 1 wherein as the beam propagates through the medium, the acoustic wave subjects the first and second polarization components to respective first and second diffraction efficiencies, and the predetermined length is selected so that the amount of rotation compensater for the effect of the diffraction efficiency to which the first polarization component is subjected by an amount that is related to the second diffraction efficiency and compensates for the effect of the diffraction efficiency to which the second polarization component is subjected by an amount that is related to the first diffraction efficiency, thereby to provide substantially equal diffraction efficiencies of the polarization components of the optical beam.

6. The acousto-optic beam deflector of claim 1 wherein the optical beam is of randomly polarized light.

7. In an acousto-optic deflector, a method of processing an optical beam so that its polarization components are deflected with equal efficiencies, comprising:
   providing an optically active stress optic medium;
   directing an optical beam having first and second polarization components for transmission through the medium and rotation of the polarization components;
   introducing into the medium a longitudinal acoustic wave that subjects the first and second polarization components to different diffraction efficiencies as the beam travels through the medium; and
   coordinating an amount of optical rotation developed by the medium with the difference in the diffraction efficiencies to which the first and second polarization components are subjected to provide an optical beam whose polarization components are deflected with substantially equal efficiencies.

8. The method of claim 7 wherein the optical beam is of randomly polarized light.

9. The method of claim 7 wherein the amount of optical rotation is coordinated with the difference in diffraction efficiencies by selecting a medium of a length that develops the amount of optical rotation that offsets the effect of the difference in diffraction efficiencies.

10. The method of claim 9 wherein the length is equal to or an integral multiple of $\pi/2\phi$, wherein $\phi$ is the specific rotation of the medium.